United States Patent
Zhang et al.

(10) Patent No.: US 10,602,297 B2
(45) Date of Patent: Mar. 24, 2020

(54) PROCESSING AUDIO SIGNALS

(71) Applicant: NXP B.V., Eindhoven (NL)

(72) Inventors: Xueru Zhang, Wilsele (BE); Eric Chambatte, Leuven (BE); Denis Kutuzov, Leuven (BE); Nilesh Madhu, Kessel-Lo (BE); Abid Rashid, Calcot (GB)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/828,881

(22) Filed: Dec. 1, 2017

(65) Prior Publication Data

US 2018/0184225 A1    Jun. 28, 2018

(30) Foreign Application Priority Data

Dec. 23, 2016   (EP) .................................. 16206555

(51) Int. Cl.
| | | |
|---|---|---|
| H04S 7/00 | (2006.01) | |
| H04R 1/20 | (2006.01) | |
| H04R 3/00 | (2006.01) | |
| H04M 3/56 | (2006.01) | |
| H04R 1/40 | (2006.01) | |

(52) U.S. Cl.
CPC ............. *H04S 7/303* (2013.01); *H04M 3/568* (2013.01); *H04R 1/406* (2013.01); *H04S 2400/01* (2013.01); *H04S 2400/15* (2013.01); *H04S 2420/01* (2013.01)

(58) Field of Classification Search
CPC . H04R 3/00; H04R 1/20; H04R 1/406; H04R 29/00; H04S 7/301; H04S 7/302; H04S 7/303; H04S 2400/01; H04S 2400/11; H04S 2400/15; H04S 2420/01; H04M 3/568

See application file for complete search history.

(56) References Cited

U.S. PATENT DOCUMENTS

| | | | | |
|---|---|---|---|---|
| 6,021,206 A | * | 2/2000 | McGrath ................. | H04S 3/004 381/310 |
| 2009/0052700 A1 | * | 2/2009 | Takumai .................. | H04R 3/12 381/303 |
| 2015/0271619 A1 | * | 9/2015 | Sun ......................... | H04S 3/008 348/47 |
| 2016/0142651 A1 | | 5/2016 | Sun et al. | |
| 2016/0241980 A1 | * | 8/2016 | Najaf-Zadeh ........... | H04S 7/303 |
| 2017/0353812 A1 | * | 12/2017 | Schaefer ................. | H04S 7/303 |
| 2018/0255398 A1 | * | 9/2018 | Fischer ................... | H04R 3/12 |

FOREIGN PATENT DOCUMENTS

EP         2346028 A1      7/2011

OTHER PUBLICATIONS

Smart Electron:X; "Stereo Field Rotation Via Transformation Matrix"; retreived from the Internet http://musicdsp.org/showArchiveComment.php?ArchiveID=255; 7 pages (Nov. 16, 2017).

* cited by examiner

*Primary Examiner* — Thang V Tran (57) ABSTRACT

The disclosure relates to a processing multi-channel audio signals, an example embodiment including a method of processing a multi-channel audio signal, the method comprising: determining a location of sound sources (101, 102) within the signal; applying a rotation operation to the signal, a direction of the rotation operation dependent on the location of the sound sources in the signal; and generating a rotated audio signal.

18 Claims, 6 Drawing Sheets

PROCESSING AUDIO SIGNALS

CROSS-REFERENCE TO RELATED APPLICATIONS

This application claims the priority under 35 U.S.C. § 119 of European patent application no. 16206555.1, filed Dec. 23, 2016 the contents of which are incorporated by reference herein.

FIELD

The disclosure relates to processing multi-channel audio signals.

BACKGROUND

With the increasing popularity of smart devices, for example smartphones, tablets and virtual reality (VR) or augmented reality (AR) devices, it has become very common for users to use these smart devices to make audio recordings. Users may like to perform post-processing on these recordings to achieve desired effects, for example increasing the volume of the audio signal, suppressing background noise, or focusing on a specific voice. A user may also like to rotate the recorded audio signals.

Audio rotation is particularly useful for virtual/augmented reality applications. When a user of a VR or AR device rotates their head, the displayed video rotates to match the user's movements. A more accurate impression of moving in the real world can be achieved if the sounds played to the user also seem to rotate with the user. For example, in an AR device for teleconferencing, the position of a person talking should appear to rotate when a listener rotates their head.

SUMMARY

In accordance with a first aspect there is provided a method of processing a multi-channel audio signal, the method comprising the steps of:
determining a location of sound sources within the audio signal;
applying a rotation operation to the audio signal, a direction of the rotation operation dependent on the location of the sound sources in the signal; and
generating a rotated audio signal.

The step of determining the location of sound sources may comprise classifying sound sources as located in a first region or a second region relative to a recording device. The first region may be in front of the recording device and the second region may be behind the recording device.

The step of applying a rotation operation to the signal may comprise:
separating the signal into a first signal and a second signal, the first signal comprising the sound sources classified as located in the first region, and the second signal comprising sound sources classified as located in the second region;
applying a first rotation operation to the front signal to generate a rotated first signal; and
applying a second rotation operation to the back signal to generate a rotated second signal.

The step of generating a rotated audio signal may comprise combining the rotated first signal with the rotated second signal to form the rotated audio signal. The first and second rotation operations may rotate signals in opposite directions by the same rotation angle.

The step of determining the location of sound sources may comprise determining the location of each of a plurality of sound sources within the audio signal.

The step of determining the location of sound sources may further comprise determining a direction of arrival of each sound source at the recording device.

The step of applying a rotation operation may comprise:
generating a rotation matrix relating the sound source locations to desired sound source locations; and
applying the rotation matrix to the signal.

The method may further comprise transforming the audio signal into the frequency domain, wherein the step of generating a rotated audio signal comprises transforming the signal into the time domain after the rotation operation has been applied to the signal. Other transforms may alternatively be applied, such as a wavelet transform.

The step of determining a location of sound sources within the signal may comprise estimating the location of the sound sources using a regression algorithm.

The step of determining a location of sound sources within the signal may comprise comparing the signal to pre-determined calibration information associated with the recording device. This may be done by establishing the location of sound sources by determining the values of s for which the function $\|y-Hs\|^2+\lambda\|s\|^2$ is a minimum, where y is a matrix of size M×1 representing the observed signals, with M the number of channels in the audio signal, s is a vector with size N×1 representing a vector of the sound source locations with N the number of possible sound source candidates, H is the calibration matrix with size M×N, and $\lambda$ is the Lagrange multiplier.

In accordance with a second aspect there is provided an audio processing device comprising:
an input for receiving a multi-channel audio signal;
a processor operable to perform the method of the first aspect on the signal; and
an output for outputting the rotated audio signal.

In accordance with a third aspect there is provided a computer program comprising instructions for causing a processor to perform the method according to the first aspect.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which

FIG. 4b is a schematic diagram of the result of a rotation operation being performed on the sound sources of FIG. 4a;

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 1A:
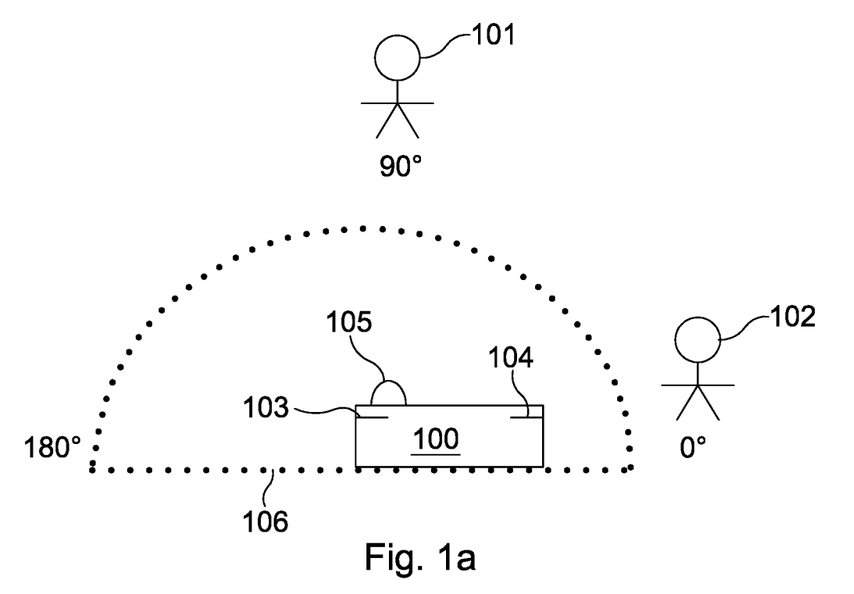
FIGS. 1a and 1b are schematic diagrams of a rotation operation on an audio signal comprising two sound sources.
Figure 1B:
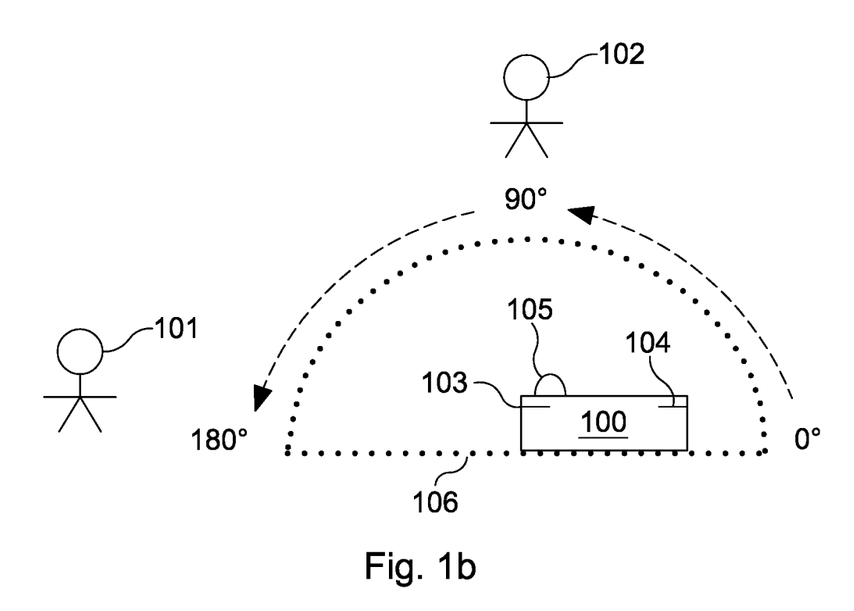

An example of an audio rotation is shown in FIGS. 1a and 1b. In this example, a recording device 100 makes an audio recording comprising two sound sources (or, in the illustrated example, speakers), source 101 and source 102. The recording device 100 comprises two microphones 103, 104, so that two-channel audio can be recorded. The recording device 100 also comprises a camera 105 for visual recording.

In FIG. 1a, both sources 101 and 102 are located within the same half of a two dimensional plane around the recording device 100. The direction of arrival (DOA) of sound from sources 101, 102 at the recording device 100 lies within the azimuth range of 0-180° (referred to as "in front" of the device 100 below). An origin for measuring angles may be defined by a line 106 passing through the centre the microphones 103, 104. In the illustrated example, source 101 is located at an angle of 90° relative to the zero degree line or origin 106, and source 102 is located at 0°.

Having recorded sound from sources 101, 102, the recorded audio may be played back to a listener, for example using a VR device. The video recording from camera 103 may also be played to the user. If the user rotates their head by an angle θ, the video and audio should rotate by an equal angle to match the user's movements.

In FIG. 1b, a 90° clockwise rotation of the device 100 (representing an equivalent rotation of a user watching/listening to the recording) is shown. To mimic a real world rotation of 90° clockwise, the sound sources 101, 102 must appear to have rotated by 90° anticlockwise. Thus, after the rotation, source 101 should be perceived to have moved from 90° to 180° relative to origin 106, while source 102 should be perceived to have moved from 0 to 90° relative to origin 106. In this example and all others described herein, a clockwise rotation of the device is applied. Anticlockwise rotations may alternatively be applied.

The apparent rotation of sources 101, 102 can be achieved by processing the recorded audio to rotate the audio signal. Conventionally this can be achieved by applying a rotation matrix to the recorded two-channel signal. Representing the two channel signal as left and right channels $y_{left}$ and $y_{right}$ (for example $y_{left}$ may be the audio recorded by microphone 103 and $y_{right}$ the audio recorded by microphone 104), the rotated left and right audio channels $\hat{y}_{left}$ and $\hat{y}_{right}$ can be generated using:

$$\begin{bmatrix} \hat{y}_{left} \\ \hat{y}_{right} \end{bmatrix} = \begin{bmatrix} f_1(\theta) & f_2(\theta) \\ f_3(\theta) & f_4(\theta) \end{bmatrix} \begin{bmatrix} y_{left} \\ y_{right} \end{bmatrix}, \quad (1)$$

where functions $f_{1-4}(\theta)$ are cosine/sine functions of the rotation angle θ.

Figure 2A:
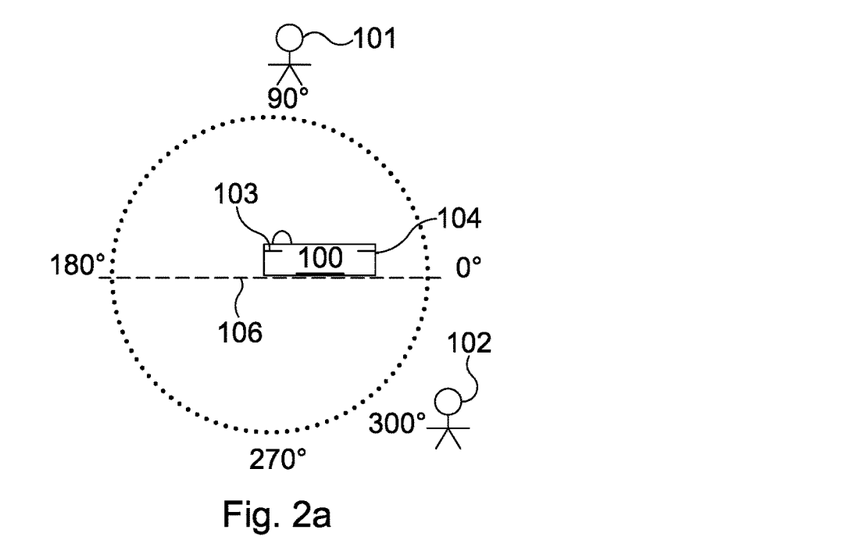
FIG. 2a is a schematic diagram of a device recording two sound sources in front and behind the device.
Figure 2B:
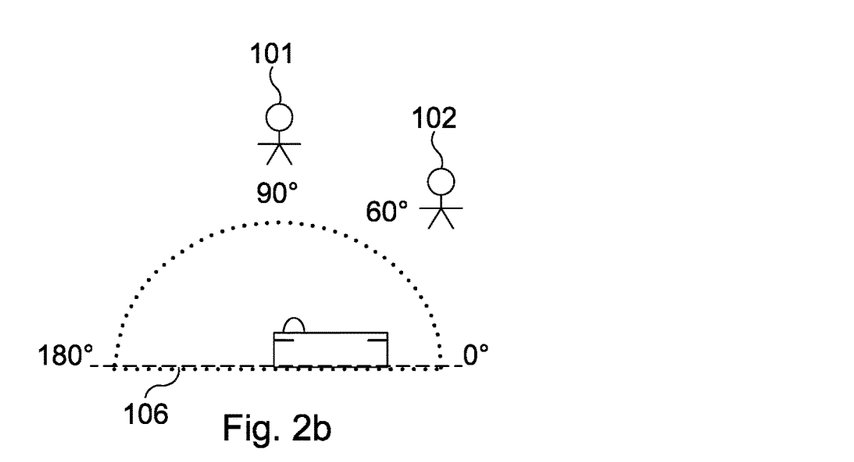
FIG. 2b is a schematic diagram of the two sound sources from FIG. 2a after incorrectly identifying the location of one of the sources prior to a rotation operation.
Figure 2C:
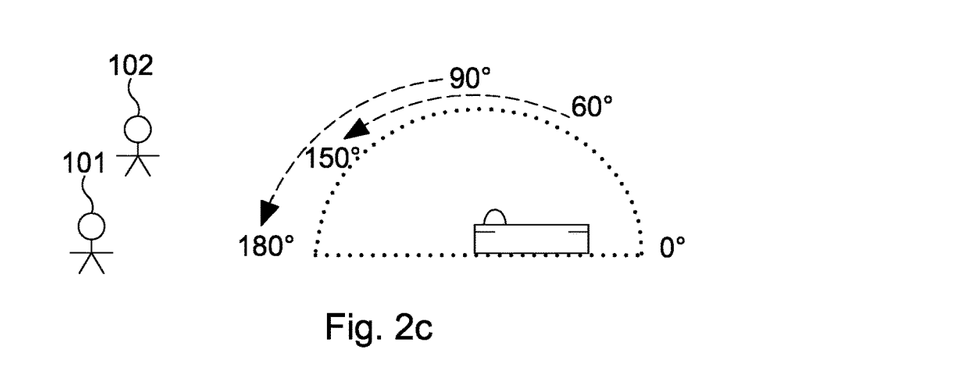
FIG. 2c is a schematic diagram of the two sound sources from FIG. 2b after a rotation operation.

The above conventional rotation matrix approach can correctly rotate audio signals when all the sound sources are located within a common half of a two dimensional plane relative to the recording device. However, if the sound sources are spread around the full azimuthal two dimensional plane, the conventional approach fails, as demonstrated in FIG. 2.

In FIG. 2a, source 101 is again located during recording at an azimuthal angle of 90° relative to the origin 106, i.e. in front of the device 100. Source 102 is in this example located at an angle of 300° relative to the origin 106. Sound sources with a DOA in the azimuth range 180°-360° are referred to herein as "behind" the device 100.

Microphones 103, 104 may be standard omnidirectional microphones, which do not record the direction of arrival of sound. The sine/cosine rotation technique described above is not designed to distinguish between sound sources located in front of and behind the device 100. Device 100 can determine an angle of arrival of the sound from a source, for example by comparing the difference in amplitude and/or phase of sound received at microphone 103 and microphone 104, but the solution is not unique. Thus device 100 perceives source 102 to be in front of the device 100 at an angle of 60° relative to origin 106, as shown in FIG. 2b.

The conventional matrix rotation method applies the same rotation angle θ to all sound sources. For a user/device rotation of 90° clockwise, applying the conventional matrix will generate a rotated signal in which source 101 correctly appears to be at an angle 180°. However, because source 102 is misperceived to be at 60°, it is rotated to an apparent angle of 150°, as shown in FIG. 2c. This rotation is clearly not correct. Sources 101, 102 were originally separated by 150°, but in the rotated signal now seem to be separated by only 30°. This results in a rotated audio signal that will not match a rotated video signal. The visual position of source 102 will be 120° apart from the apparent direction of arrival of the sound from source 102.

Figure 3:
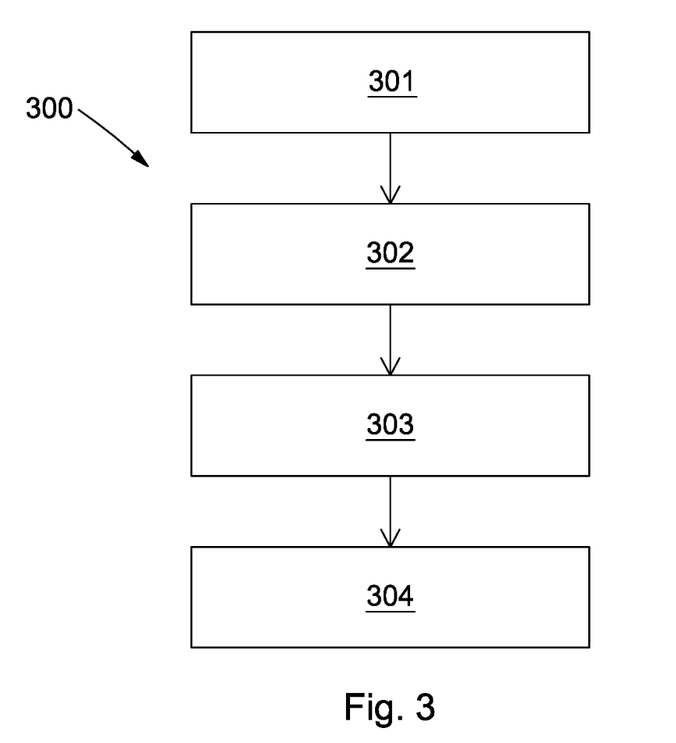
FIG. 3 is a schematic flow diagram of an example method of rotating an audio signal.

A method 300 of rotating an audio signal according to an embodiment of this disclosure is shown in FIG. 3. According to this method, a multi-channel (e.g. three-channel or higher) audio signal is provided at step 301. The audio signal may be a recording made by a recording device such as device 400 (see FIG. 4) having three or more microphones arranged in a planar array.

At step 302, the locations of the sound sources (such as speakers 101, 102) that produced the sounds within the audio signal are determined. The recording may for example comprise three or more channels, making it possible to extract position information from the audio signal. The determination can be made by for example comparing the recorded signal to calibration information, as described below, or by independent component analysis (ICA). Other methods may alternatively be used. Determining the location may comprise determining the actual position of each sound source, or classifying a sound source as in front of the device or behind the device.

At step 303, a rotation operation is applied to the audio signal. A direction of the rotation operation depends upon the location of the sound source. For example, sound sources determined to be located in front of the recording device can be rotated in a first direction, and those determined to be located behind the recording device can be rotated in a second, opposite direction.

Finally at step 304 a rotated audio signal is generated.

Determining the location of the sound sources in the audio signal allows method 300 to correctly rotate audio signals, even if the sound sources are spread around the full 2D azimuthal plane, or even spread across full 3D space.

Figure 4A:
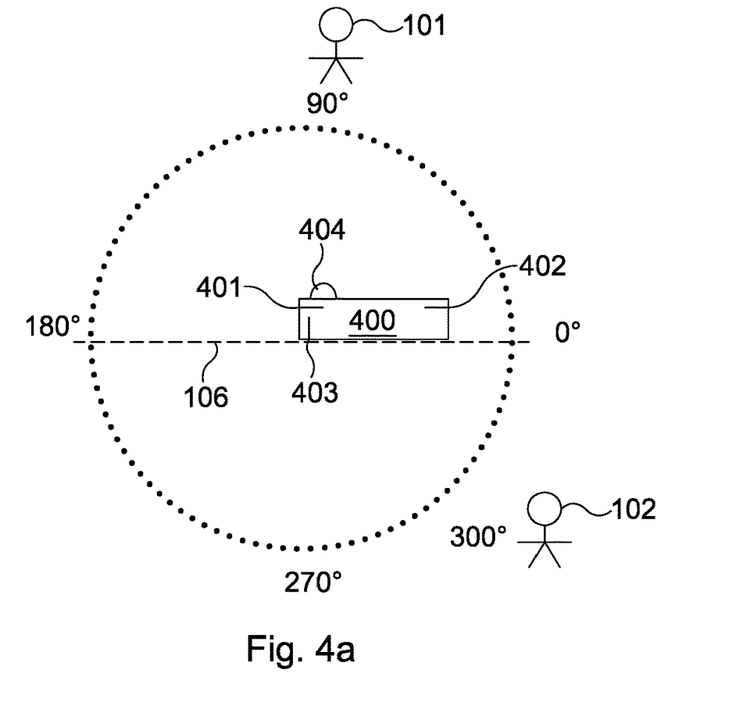
FIG. 4a is a schematic diagram of a device recording two sound sources in front and behind the device.

An example of the operation of method 300 is illustrated in FIGS. 4a and 4b. In FIG. 4a the arrangement of sources 101, 102 is identical to that shown in FIG. 2a. A recording device 400 records sounds from a speaker 101 located at 90° and a speaker 102 located at 300° relative to an origin 106. The recording device 400 comprises three microphones 401-403 in a planar (or alternatively 3D) array. The recording device further comprises a camera 404.

Figure 4B:
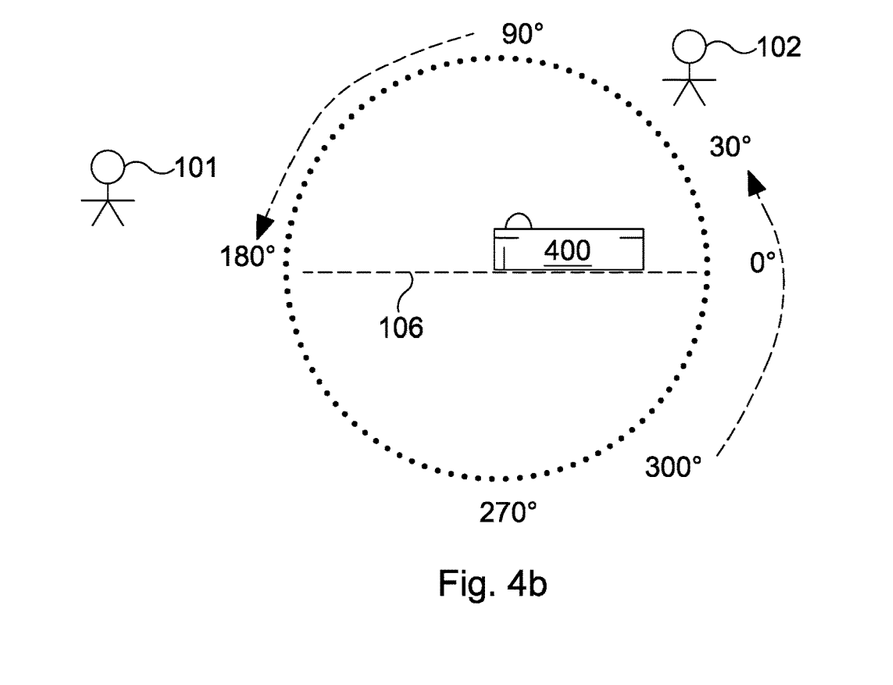

FIG. 4b represents a 90° clockwise rotation of the user/device. Method 300 described above is used to process the recorded audio signal. Source 101 is rotated anti-clockwise to an apparent position of 180° to the origin 106, as was the case in FIG. 2c. Due to the determination of location of sound sources 101, 102, the correct initial position of source 102 is identified as being located at 300° rather than at 60°, unlike in FIG. 2b. Applying the 90° anticlockwise rotation results in source 102 being perceived to be at an angle of 30° to the origin 106. Thus the perceived rotated positions of sources 101, 102 remain 150° apart, and the rotated sound will match a rotated video displayed to a user.

Sound sources may be localised for example using a predefined calibration of the recording device. For example, a calibration matrix H which maps the received signal to source locations may be estimated. The calibration matrix may be determined from sounds played at known source locations. The calibration may be performed for the recording device during its manufacture and stored in the device for later use. The estimation of the calibration matrix H may be similar to the estimation of a head-related transfer function [see reference 1]. Other example algorithms to estimate the calibration matrix H include a multiplicative transfer function method [reference 2] or the relative transfer function estimation [reference 3]. Any appropriate input signal can be chosen for these methods. Some commonly used signals are white noise or speech.

Having determined the calibration matrix H, the sound source locations may be estimated from the signals received by the recording device. One algorithm that may be used to estimate the location of sound signals is known as the $L_2$ norm constraint least squares approach. This approach ensures the sparsity of the number of active sources. In particular, the location of the sound sources can be estimated using the following relationship:

$$\hat{s} = \arg\min_{s}(\|y - Hs\|^2 + \lambda \|s\|^2), \quad (2)$$

where y is a matrix of size M×1, representing the observed signals, with M the number of recording microphones/channels, s is a vector with size N×1, representing a vector of the sound source locations with N the number of possible sound source candidates, H is the calibration matrix with size M×N, and λ is the Lagrange multiplier. In other words, the relationship establishes the location of the sound sources by determining the values of s for which the function $\|y - Hs\|^2 + \lambda \|s\|^2$ is a minimum.

Before estimating the sound source locations, the recorded audio signal is divided into overlapping frames and transformed into the frequency domain, for example using a short-time Fourier transform (STFT) to produce the observed signal vector y. Other transforms may also be applicable, provided the appropriate reverse transform is applied after rotation to transform the signal back into the time domain.

Figure 5:
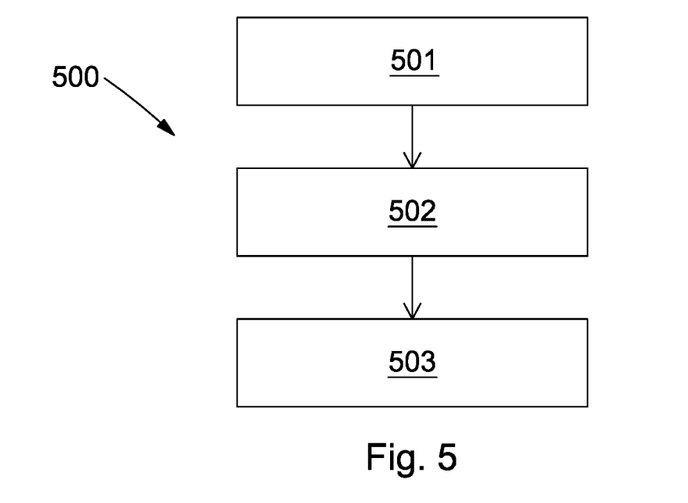
FIG. 5 is a schematic flow diagram of an example algorithm for rotating an audio signal.

After the location of the sound sources 101, 102 in the signal have been determined or estimated, the audio signal is processed to provide a rotated signal. FIG. 5 illustrates an example of an algorithm 500 which can be used to rotate the audio signal. Algorithm 500 comprises generating a rotation matrix which relates the identified locations of sound sources to desired locations. Algorithm 500 may be used in particular where a calibration matrix H and sound source vector s have been determined during localisation, as described above.

At step 501 a rotation matrix is generated, which may comprise rotating the calibration matrix H to produce a rotated calibration matrix $\hat{H}$ whose columns are reordered from the columns of the original calibration matrix H according to the desired source locations At step 502 the rotated calibration matrix $\hat{H}$ is applied to the sound source vector s to yield a rotated output signal $\hat{y}$:

$$\hat{y} = \hat{H}s \quad (3)$$

At step 503 the rotated signal $\hat{y}$ is transformed back into the time domain to produce a rotated audio signal.

Figure 6:
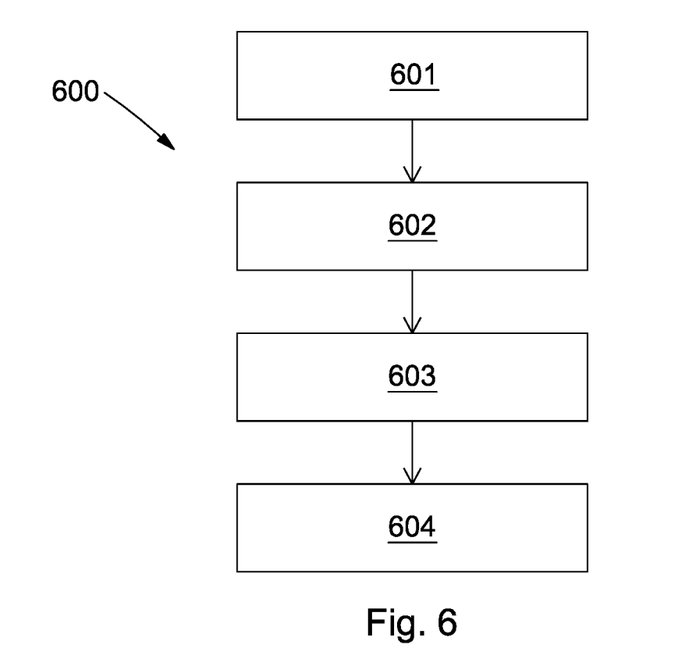
FIG. 6 is a schematic flow diagram of an alternative algorithm for rotating an audio signal.

An alternative algorithm 600 is illustrated in FIG. 6. At step 601 sound sources in the signal are classified as front sound sources or back sound sources, i.e. whether they are in front or behind the audio recording device. Algorithm 600 thus does not require an exact location for each sound source to be determined in the localisation stage, only that the localisation is sufficient to determine whether a sound source is in front of the recording device or behind it. For example energy or other characteristics of the sound may be used to determine the appropriate classification. Classifications other than front/back may be used. The classification may classify sound sources as being in any first region or second region relative to the recording device, where the first and second regions are mutually exclusive. For example the algorithm 600 may classify sound sources as being above the recording device or below the recording device.

At step 602 the audio signal y is separated into two components, $y_{front}$ comprising signals from those sound sources classified as front sound sources and $y_{back}$ comprising signals from those sound sources classified as back sound sources. The received microphone signal y can be viewed as the sum of front sources and back sources transformed with the estimated calibration matrix H:

$$y = y_{front} + y_{back} \quad (4)$$

with $$\begin{cases} y_{front;m} = \sum_{n \in N_{front}} H_{m,n} s_n \\ y_{back;m} = \sum_{n \in N_{back}} H_{m,n} s_n \end{cases} \quad (5)$$

where m is the microphone index and n is the sound source index.

At step 603, each of the separated signals $y_{front}$ and $y_{back}$ is rotated separately, for example using the sine/cosine rotation of equation (1). The two signals $y_{front}$ and $y_{back}$ are rotated by the same angle, but in opposite directions.

At step 604, the rotated signals are recombined to form a rotated output signal. The inverse transform may be applied, either before or after recombination, to transform the output signal into the time domain.

Other algorithms, such as blind source separation (BSS) algorithms, may be used to separate the incoming audio signal into a front signal and a back signal.

Figure 7:
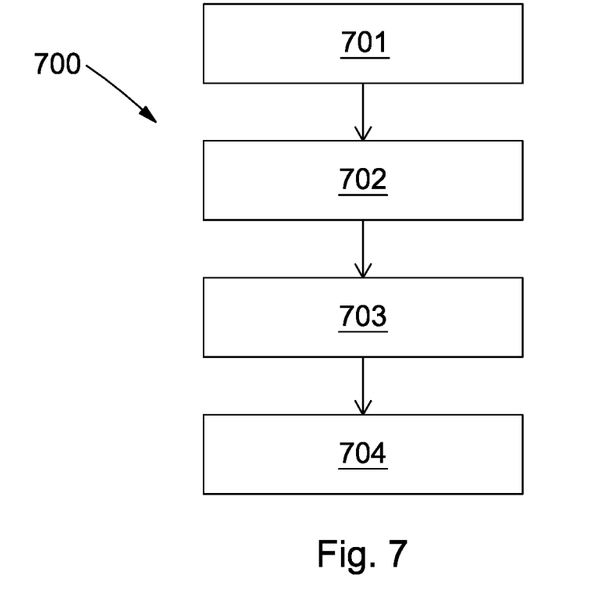
FIG. 7 is a schematic flow diagram of a further alternative algorithm for rotating an audio signal.

A further alternative algorithm 700 is illustrated in FIG. 7. At step 701, sound sources in the signal are classified as front sound sources or back sound sources, similarly to step 601 above.

At step 702 a direction of arrival (DOA) of each sound source at the recording device is determined or estimated, for example using a two channel DOA algorithm. Step 702 may alternatively be performed before step 701. By combining the front/back classification (step 701) with the direction of arrival analysis (step 702), a full 2D plane direction of arrival (an azimuth range of 0-360° is covered.

At step 703 the audio signal is rotated by applying a rotation matrix to rotate sound sources in consistent directions, similarly to steps 501 and 502 of algorithm 500, to produce a rotated output signal.

At step 704 the rotated output signal is inverse Fourier transformed into the time domain to produce a rotated audio signal.

Although only two sources of sound are illustrated in the examples above, the methods and algorithms can be applied to any number of sound sources. Further, the methods and algorithms can be extended to enable audio rotation where the sound sources are distributed around full 3D space, not just in the 2D azimuthal plane. For example, the localisation step may determine the 3D position of sound sources. The rotated matrix of algorithm 500 may relate sound source locations to desired sound source locations in full 3D space. Alternatively the algorithm 600 may further comprise classifying the elevation of the sound sources, for example classifying sources as above the recording device or below the recording device. The audio signal may then be separated into those components classified as front and back and/or top and bottom. A similar elevation classification may be used in algorithm 700.

For 2D rotation at least three spatially separated microphones in a planar array are required to record the audio sources. For 3D rotation, at least four microphones in a non-coplanar array are required. In either case, a sensor may be used in addition to the microphones, or may replace one of the required microphones. The sensor may be any sensor that is able to determine a position of sound sources, or to classify their position (such as front/back, top/bottom). The sensor may be a vector microphone or a camera (using image processing to determine locations of sound sources).

The methods and algorithms described above may be implemented with audio processing hardware, for example an audio processor associated with an audio, AR, or VR device. In particular the processor may receive a non-rotated audio signal through an input, apply the above methods and algorithms to rotate the signal, and output a rotated audio signal through an output. The methods and algorithms may be implemented in software, such as audio processing software associated with an audio device or stand-alone software, such as a downloadable app.

The methods and algorithms described above may be used with a smart device such as a smartphone, portable computer, or augmented reality device. For example, they can be used by the user of a smart device to rotate recorded audio signals. By applying the methods and algorithms during teleconferences using augmented reality devices, the calling/called parties in the teleconference may have the flexibility to change the video and audio they see and hear, for example rotating the sound as the listener moves around a room. The methods and algorithms may be used to redistribute sound around a listener, for example to reposition sound sources from the side to the front of the listener. In this way, side sound sources which may otherwise be considered as interference signals to be discarded may be refocused by rotating them to the front of the listener. Further, the methods and algorithms may be used to remix music signals.

Although the illustrations of rotation above show only clockwise rotations of the recording device/listener, the methods and algorithms also apply for anti-clockwise rotations of the recording device/listener.

Figure 8:
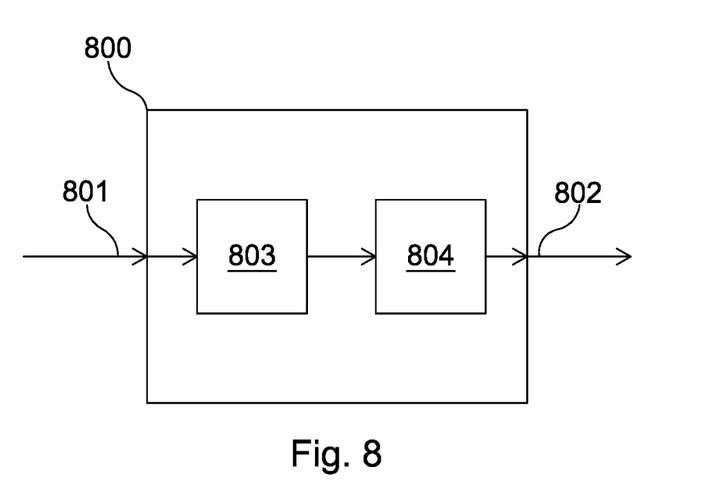
FIG. 8 is a schematic diagram of a device for performing a rotation operation on an audio signal.

FIG. 8 illustrates schematically an audio processing device 800 for performing a method according to the examples described above. The device 800 comprises an input 801 for receiving a multi-channel audio signal and an output 802 for outputting a rotated audio signal. The device 800 may be a processor suitably arranged or programmed to perform the methods as described above. The processor may for example comprise a location module 803, which is configured to determine the location of sound sources within an audio signal received at the input 801, and a rotation module 804 configured to apply a rotation operation to the audio signal, a direction of the rotation operation being dependent on the location of the sound sources in the signal. The device 800 may further comprise Fourier transform modules for transforming the input audio signal into the frequency domain and for transforming the output audio signal back into the time domain. The device 800 may also comprise further modules configured to perform other aspects of the methods described above.

From reading the present disclosure, other variations and modifications will be apparent to the skilled person. Such variations and modifications may involve equivalent and other features which are already known in the art of audio processing, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

REFERENCES

[1] *Introduction to head-related transfer functions (HRTFs): Representations of HRTFs in time, frequency, and space.* C. I. Cheng, G. H. Wakefield, AES: Journal of the Audio Engineering Society 49(4), 231-249, April 2001.

[2] *On Multiplicative Transfer Function Approximation in the Short-Time Fourier Transform Domain.* Yekutiel Avargel, Israel Cohen, IEEE Signal Processing Letters 14(5), 337-340, June 2007.

[3] *Relative Transfer Function Identification Using Speech Signals.* Israel Cohen, IEEE Transactions on Speech and Audio Processing 12(5), 451-459, October 2004.

The invention claimed is:

1. A method of processing a multi-channel audio signal, the method comprising:
  determining a location of sound sources within the audio signal;
  applying a rotation operation to the audio signal, a direction of the rotation operation dependent on the location of the sound sources in the signal;
  generating a rotated audio signal;
  wherein determining the location of sound sources within the signal comprises comparing the signal to predetermined calibration information associated with a recording device; and
  transforming the audio signal into the frequency domain;
  wherein generating the rotated audio signal comprises transforming the signal into the time domain after the rotation operation has been applied to the signal.

2. The method of claim 1,
  wherein determining the location of sound sources comprises classifying sound sources as located in a first region or a second region relative to a recording device.

3. The method of claim 2,
  wherein the first region is in front of the recording device and the second region is behind the recording device.

4. The method of claim 2
  wherein applying the rotation operation to the signal comprises:
    separating the signal into a first signal and a second signal, the first signal comprising the sound sources classified as located in the first region, and the second signal comprising sound sources classified as located in the second region;
    applying a first rotation operation to the first signal to generate a rotated first signal; and
    applying a second rotation operation to the second signal to generate a rotated second signal.

5. The method of claim 4,
  wherein generating the rotated audio signal comprises combining the rotated first signal with the rotated second signal to form the rotated audio signal.

6. The method of claim 4:
  wherein the first and second rotation operations rotate signals in opposite directions by a same rotation angle.

7. The method of claim 1,
  wherein determining the location of sound sources comprises
    determining the location of each of a plurality of sound sources within the audio signal.

8. The method of claim 7,
  wherein determining the location of sound sources further comprises
    determining a direction of arrival of each sound source at the recording device.

9. The method of claim 7,
  wherein applying a rotation operation comprises:
    generating a rotation matrix relating the sound source locations to desired sound source locations; and
    applying the rotation matrix to the signal.

10. The method of claim 1,
  wherein determining a location of sound sources within the signal comprises
    estimating the location of the sound sources using a regression algorithm.

11. The method of claim 1:
  wherein determining the location of sound sources within the signal comprises
    establishing the location of sound sources by determining the values of s for which the function $\|y-Hs\|^2 + \lambda\|s\|^2$ is a minimum,
    where y is a matrix of size M×1 representing the observed signals, with M the number of channels in the audio signal, s is a vector with size N×1 representing a vector of the sound source locations with N the number of possible sound source candidates, H is the calibration matrix with size M×N, and $\lambda$ is the Lagrange multiplier.

12. An audio processing device comprising:
  an input for receiving a multi-channel audio signal;
  a processor operable to perform the method of claim 1 on the signal; and
  an output for outputting the rotated audio signal.

13. An article of manufacture including at least one non-transitory, tangible machine readable storage medium containing executable machine instructions for causing a processor to perform the method according to claim 1.

14. A method of processing a multi-channel audio signal, the method comprising:
  determining a location of sound sources within the audio signal;
  applying a rotation operation to the audio signal, a direction of the rotation operation dependent on the location of the sound sources in the signal; and
  generating a rotated audio signal;
  wherein determining the location of sound sources comprises classifying sound sources as located in a first region or a second region relative to a recording device.
  wherein applying a rotation operation to the signal comprises:
    separating the signal into a first signal and a second signal, the first signal comprising the sound sources classified as located in the first region, and the second signal comprising sound sources classified as located in the second region;
    applying a first rotation operation to the first signal to generate a rotated first signal; and
    applying a second rotation operation to the second signal to generate a rotated second signal.

15. An audio processing device comprising:
an input for receiving a multi-channel audio signal;
a processor operable to, determine a location of sound sources within the audio signal;

apply a rotation operation to the audio signal, a direction of the rotation operation dependent on the location of the sound sources in the signal; and generate a rotated audio signal;

wherein determine the location of sound sources includes, classify sound sources as located in a first region or a second region relative to a recording device.

wherein apply the rotation operation to the signal includes, separate the signal into a first signal and a second signal, the first signal including the sound sources classified as located in the first region, and the second signal including sound sources classified as located in the second region;

apply a first rotation operation to the first signal to generate a rotated first signal; and apply a second rotation operation to the second signal to generate a rotated second signal; and an output for outputting the rotated audio signal.

16. The device of claim 15, wherein generating the rotated audio signal comprises combining the rotated first signal with the rotated second signal to form the rotated audio signal.

17. The device of claim 15:

wherein the first and second rotation operations rotate signals in opposite directions by a same rotation angle.

18. The device of claim 15, wherein determining the location of sound sources comprises determining the location of each of a plurality of sound sources within the audio signal.

* * * * *